US007929722B2

(12) United States Patent
Shridhar et al.

(10) Patent No.: US 7,929,722 B2
(45) Date of Patent: Apr. 19, 2011

(54) HEARING ASSISTANCE USING AN EXTERNAL COPROCESSOR

(75) Inventors: Vasant Shridhar, Royal Oak, MI (US); Duane Wertz, Byron, MI (US); Malayappan Shridhar, West Bloomfield, MI (US)

(73) Assignee: Intelligent Systems Incorporated, West Bloomfield, MI (US)

(*) Notice: Subject to any disclaimer, the term of this patent is extended or adjusted under 35 U.S.C. 154(b) by 381 days.

(21) Appl. No.: 12/273,389

(22) Filed: Nov. 18, 2008

(65) Prior Publication Data

US 2010/0040248 A1 Feb. 18, 2010

Related U.S. Application Data

(60) Provisional application No. 61/188,840, filed on Aug. 13, 2008.

(51) Int. Cl.
*H04R 25/00* (2006.01)
*H04M 1/00* (2006.01)

(52) U.S. Cl. ...................... 381/314; 381/312; 455/569.1

(58) Field of Classification Search .................. 381/312, 381/314, 315; 455/569.1
See application file for complete search history.

(56) References Cited

U.S. PATENT DOCUMENTS

| | | | |
|---|---|---|---|
| 4,918,737 | A | 4/1990 | Luethi |
| 5,390,254 | A | 2/1995 | Adelman |
| 5,479,522 | A | 12/1995 | Lindemann et al. |
| 5,710,819 | A | 1/1998 | Tøpholm et al. |
| 5,721,783 | A | 2/1998 | Anderson |
| 5,824,022 | A | 10/1998 | Zilberman et al. |
| 5,835,610 | A | 11/1998 | Ishige et al. |
| 6,021,207 | A | 2/2000 | Puthuff et al. |
| 6,035,050 | A | 3/2000 | Weinfurtner et al. |
| 6,041,129 | A | 3/2000 | Adelman |
| 6,058,197 | A | 5/2000 | Delage |
| 6,157,727 | A | 12/2000 | Rueda |
| 6,390,971 | B1 | 5/2002 | Adams et al. |
| 6,424,722 | B1 | 7/2002 | Hagen et al. |
| 6,449,662 | B1 | 9/2002 | Armitage |
| 6,556,686 | B1 | 4/2003 | Weidner |
| 6,684,063 | B2 | 1/2004 | Berger et al. |
| 6,816,600 | B1 | 11/2004 | Jakob et al. |
| 6,851,048 | B2 | 2/2005 | Armitage |
| 6,888,948 | B2 | 5/2005 | Hagen et al. |
| 6,895,345 | B2 | 5/2005 | Bye et al. |

(Continued)

OTHER PUBLICATIONS

PCT Search Report for PCT Application No. PCT/US2009/053480, mailed Mar. 10, 2010 (8 pages).

(Continued)

*Primary Examiner* — Brian Ensey
(74) *Attorney, Agent, or Firm* — Lee & Hayes, PLLC

(57) ABSTRACT

Techniques are described for enhancing a hearing assist device using one or more coprocessor devices. The hearing assist device uses a handshaking protocol to detect and pair with the one or more coprocessor devices. The hearing assist device is capable of stand-alone signal processing in the absence of the coprocessor devices. In one embodiment, the hearing assist device directs processing of a signal to the coprocessor device when the coprocessor is detected. In another embodiment, the hearing assist device detects a coprocessor device and uses the coprocessor device to supplement signal processing performed by the hearing assist device. In yet another embodiment, the hearing assist device communicates with a plurality of coprocessor devices and the work of processing the signal is shared amongst the devices according to a respective functionality of each device.

31 Claims, 6 Drawing Sheets

U.S. PATENT DOCUMENTS

| | | | | |
|---|---|---|---|---|
| 6,938,124 | B2 * | 8/2005 | Rust et al. | 711/114 |
| 6,954,535 | B1 | 10/2005 | Arndt et al. | |
| 6,975,739 | B2 | 12/2005 | Bogason et al. | |
| 6,978,155 | B2 | 12/2005 | Berg | |
| 7,054,957 | B2 | 5/2006 | Armitage | |
| 7,257,372 | B2 * | 8/2007 | Kaltenbach et al. | 455/569.1 |
| 7,283,842 | B2 | 10/2007 | Berg | |
| 7,292,698 | B2 | 11/2007 | Niederdrank et al. | |
| 2001/0007050 | A1 | 7/2001 | Adelman | |
| 2002/0091337 | A1 | 7/2002 | Adams et al. | |
| 2005/0058313 | A1 | 3/2005 | Victorian et al. | |
| 2006/0039577 | A1 * | 2/2006 | Sanguino et al. | 381/315 |
| 2006/0177799 | A9 | 8/2006 | Stuart et al. | |
| 2007/0225050 | A1 | 9/2007 | Kaltenbach et al. | |
| 2007/0239294 | A1 | 10/2007 | Brueckner et al. | |
| 2007/0282394 | A1 | 12/2007 | Segel et al. | |
| 2008/0107278 | A1 | 5/2008 | Roeck et al. | |

OTHER PUBLICATIONS

Written Opinion for PCT Application No. PCT/US2009/053480, mailed Mar. 15, 2010 (6 pages).

* cited by examiner

HEARING ASSISTANCE USING AN EXTERNAL COPROCESSOR

RELATED APPLICATION

This application claims the benefit of U.S. Provisional Application No. 61/188,840 filed Aug. 13, 2008.

TECHNICAL FIELD

The subject matter of this disclosure relates to a hearing enhancement device, and more specifically, to a hearing enhancement device capable of functioning together with a coprocessor device.

BACKGROUND

Historically, hearing aids assisted people with hearing loss by providing sound amplification. Typically, hearing aids include microphones to detect external sound, a processor to amplify the detected sound, a battery, and a speaker to present amplified sound to a user. Many hearing aids presently translate the detected sound into a digital signal and use a digital signal processor (DSP) to process the signal. The DSP can manipulate the signal by applying signal processing algorithms stored on the hearing aid to improve the quality of the amplified sound.

Wearers of hearing aids desire increasingly smaller sized devices to improve comfort and personal appearance. However, the small size of hearing aids limits functionality. This form-factor constraint is apparent in short battery life, low powered processors, and weak signal processing algorithms. Sound processing is limited due to the constraints imposed by the small size of hearing aids. For example, much of the processing power of current hearing aids is devoted to reducing feedback, and thus, remaining processing power is unable to run powerful signal processing algorithms.

It is desirable to maintain the hearing aid as a small device that is placed in or on the ear of a user. It is also desirable to hearing aid users to have a device which is portable, always present, and able to produce high quality amplified sound. Even with increases in processor power and component miniaturization, hearing aid users still have many complaints about the capabilities of current hearing aids. Therefore, methods and devices that provide improved signal processing and function within the existing form-factor constraints would have considerable utility.

SUMMARY

Most of the form-factor limitations of conventional hearing aids can be overcome by coupling a hearing aid to an external coprocessor device. Since the coprocessor device is not required to be placed in or near the ear, it is possible for the coprocessor device to have a powerful processor with greater functionality than a stand-alone hearing assist device. By sending a signal detected at the hearing assist device out to a coprocessor for processing it is possible realize the benefits of a small hearing assist device, without sacrificing signal processing power.

In one aspect, the hearing assist device has a processor and a memory to store signal processing algorithms. Thus the hearing assist device is able to process signals (e.g., audio signals converted into electronic form) without a coprocessor device. In order to communicate with the coprocessor device, the hearing assist device may also include a communication interface to communicate with the coprocessor device, and a handshaking module to receive information regarding a functionality of the coprocessor device via the communication interface. In some instances the coprocessor device may have different capabilities than the hearing assist device, so a functionality comparing module in the hearing assist device compares the functionality of the coprocessor device to a functionality of the hearing assist device. Since there may be instances in which the hearing assist device will provide better signal processing and other instances in which the coprocessor device would be a superior processor, a processor switching module in the hearing assist device may direct the signal for at least partial processing to a processor in either (or both) of the hearing assist device or the coprocessor device. The processed signal is then returned to the hearing assist device (if processed by a coprocessor device) and presented to a user by means, such as a speaker on the hearing assist device.

BRIEF DESCRIPTION OF THE DRAWINGS

The detailed description is described with reference to the accompanying figures. In the figures, the use of the same reference numbers in different figures indicates similar or identical items. These drawings depict only illustrative embodiments of the invention and are not, therefore, to be considered to be limiting of its scope.

DETAILED DESCRIPTION

This disclosure describes techniques, by which the form-factor constraints inherent in hearing aids are overcome by leveraging the processing power of an additional processor, such as a coprocessor, which does not suffer from the same form-factor constraints. Processing power superior to that provided by conventional hearing aids has become ubiquitous in modern societies in the form of mobile phones, personal digital assistants, electronic music players, desktop and laptop computers, game consoles, television set-top-boxes, automobile radios, navigation systems, and the like. Any of these devices may function as a coprocessor, while continuing to perform the primary functions of each respective device. The coprocessor may also be a device specially designed to function together with a hearing aid.

Permanent coupling to the coprocessor device, however, requires that a hearing aid user always bring a coprocessor device if he or she desires to benefit from the hearing aid. The bulk of a coprocessor device may be undesirable when, for example, engaged in sports. Operation of the coprocessor device may even be prohibited at times such as while on an airplane or near sensitive medical equipment. In such situations the hearing aid user may desire whatever benefit the hearing aid can provide even if enhanced processing of the coprocessor device is not available. Thus, it is desirable to have a hearing aid that will function as a stand-alone-device in the absence of a coprocessor device, and provide enhanced functionality if and when a coprocessor is available.

In some embodiments, the hearing aid provides sound enhancement to a user with diminished hearing capacity. However, in other embodiments, the methods and devices of the present disclosure enhance the hearing abilities of a user with or without impaired hearing. For example, appropriate signal processing algorithms used together with the subject of the present disclosure may allow a solider to distinguish the snap of a twig from other sounds in a forest, or allow a mechanic to detect a grating of gears inside a noisy engine. Accordingly, devices of the present disclosure are referred to as hearing assist devices to encompass devices used to enhance sound for users with or without hearing impairment.

Figure 1:
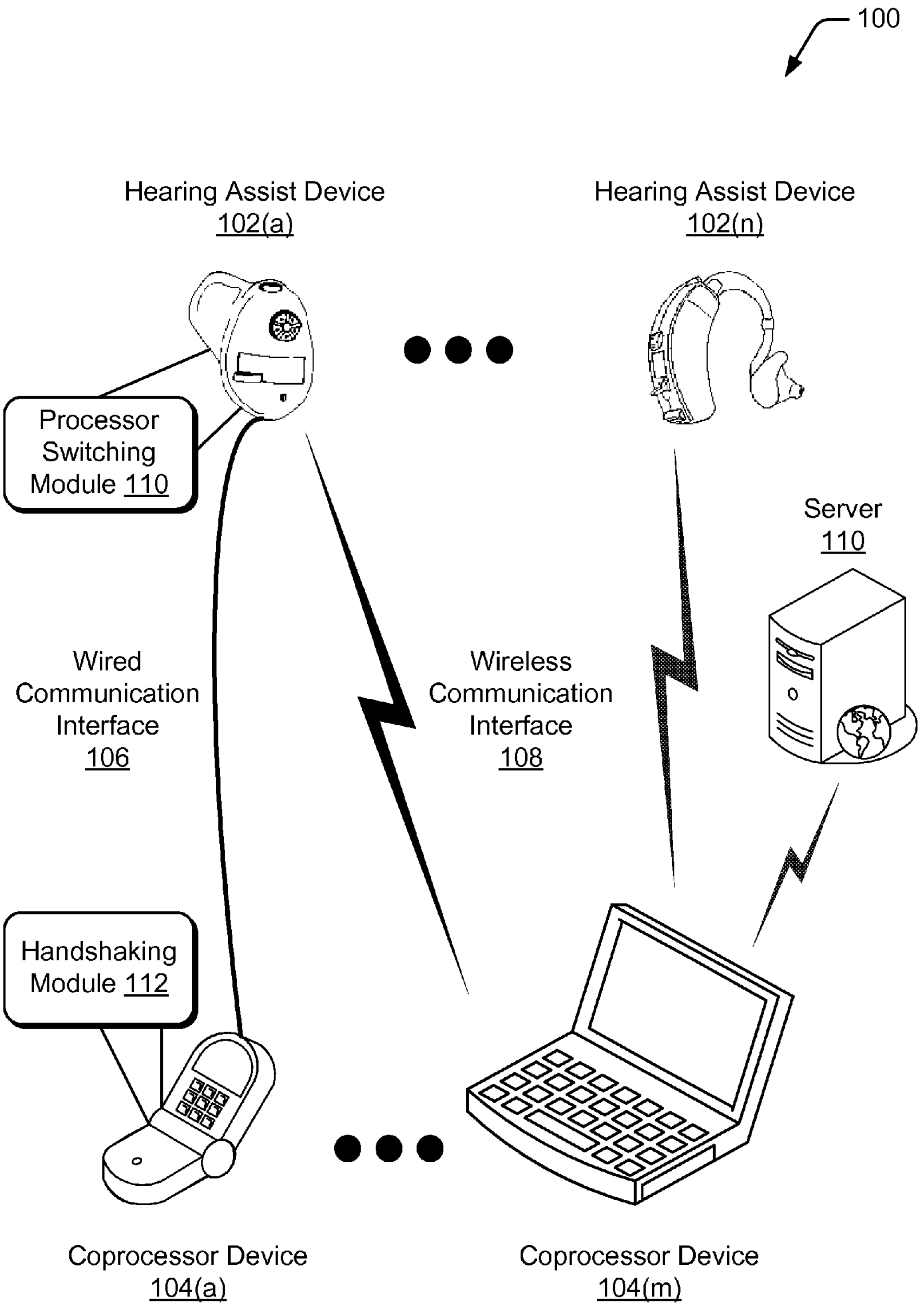
FIG. 1 illustrates a system of a plurality of hearing assist devices in communication with a plurality of coprocessor devices in accordance with one illustrative embodiment of the present disclosure.

FIG. 1 illustrates a system 100 of a plurality of hearing assist devices 102(*a*) to 102(*n*) in communication with a plurality of coprocessor devices 104(*a*) to 104(*m*). A communication interface between the hearing devices 102 and the coprocessor devices 104 may be wired 106 and/or wireless 108. The wired communication interface 106 may include, but is not limited to, controller-area network, recommended standard-232, universal serial bus, stereo wire, IEEE 1394 serial bus standard (FireWire) interfaces, or the like. The wireless communication interface 108 may include, but is not limited to, Bluetooth, IEEE 802.11x, AM/FM radio signals, wireless wide area network (WWAN) such as cellular, or the like.

Each hearing assist device 102 may include a processor switching module 110 to manage routing of signals amongst the processors of the hearing assist device 102 and one or more of the coprocessor devices 104. The coprocessor devices may include a handshaking module 112 to facilitate communication between the hearing assist device 102 and the coprocessor device 104, including sending information describing a functionality of the coprocessor device 104 to the hearing assist device 102 as part of the handshaking.

Flexibility inherent in the system 100 of the present disclosure allows one hearing assist device 102 to communicate with zero to m coprocessor devices 104. Moreover, the hearing assist device 102 may dynamically add or drop coprocessor devices 104 on the fly. The hearing assist device 102 functions as a stand-alone device when zero coprocessor devices 104 are present. The hearing assist device 102(*a*) may, for example, communicate only with coprocessor device 104(*a*) via the wired communication interface 106. In other embodiments, hearing assist device 102(*a*) may communicate with a first coprocessor device 104(*a*) via the wired communication interface 106 and a second coprocessor device 104(*m*) via the wireless communication interface. Many other communication paths are covered within the scope of the present disclosure including a hearing assist device 102 communicating with more than two coprocessor devices 104 through any combination of wired and/or wireless communication interfaces.

It is also envisioned that, in some embodiments, more than one hearing assist device 102 may communicate with a coprocessor device. For example, hearing assist device 102(*a*) and hearing assist device 102(*n*) may both communicate with coprocessor device 104(*m*) via two wireless communication interfaces 108. The two hearing assist devices, 102(*a*) and 102(*n*), may represent devices placed in a right ear and a left ear of a single user. The two hearing assist devices 102(*a*) and 102(*n*) may alternatively represent devices worn by two different users. Many other communication paths are covered within the scope of the present disclosure, including multiple users each wearing one or two hearing assist devices 102 and all of the hearing assist devices 102 using a coprocessor device 104 through a plurality of wired and/or wireless communication interfaces.

Any combination of multiple hearing assist devices 102 in communication with single or multiple coprocessor devices 104 is also within the scope of the present disclosure. For example, hearing assist device 102(*a*) may be connected to coprocessor device 104(*a*) via a wired communication interface 106 and to coprocessor device 104(*m*) via a wireless communication interface 108. While at the same time, hearing assist device 102(*n*) may also be connected to coprocessor device 104(*m*) via a wireless communication interface.

The hearing assist devices 102 may also be able to communicate with other hearing assist devices either directly (not shown) or via a coprocessor device 104 such as hearing assist device 102(*a*) communicating with hearing assist device 102 (*n*) via coprocessor device 104(*m*). Thus, a given hearing assist device 102 may stand alone and communicate with no other devices, it may communicate with a one or more coprocessor devices 104, it may communicate with a one or more other hearing assist devices 102, or it may communicate with the one or more coprocessor devices 104 and one or more other hearing assist devices 102.

The coprocessor devices 104 may also be able to communicate with other coprocessor devices (not shown). The coprocessor devices 104 may also communicate with a server 110. In some embodiments, the server 110 may be a network server connected to a network such as the Internet. Communication between the coprocessor devices 104 and the server 110 may be wired or wireless. In some embodiments, not shown, a coprocessor device 104 may be a component of a larger computing device and the server may be another component of the same larger computing device. Thus, a given coprocessor device 104 may communicate with a one or more hearing assist devices 102, and/or with a one or more other coprocessor devices 104, and/or with a one or more servers 110.

Hearing Assist Device

Figure 2:
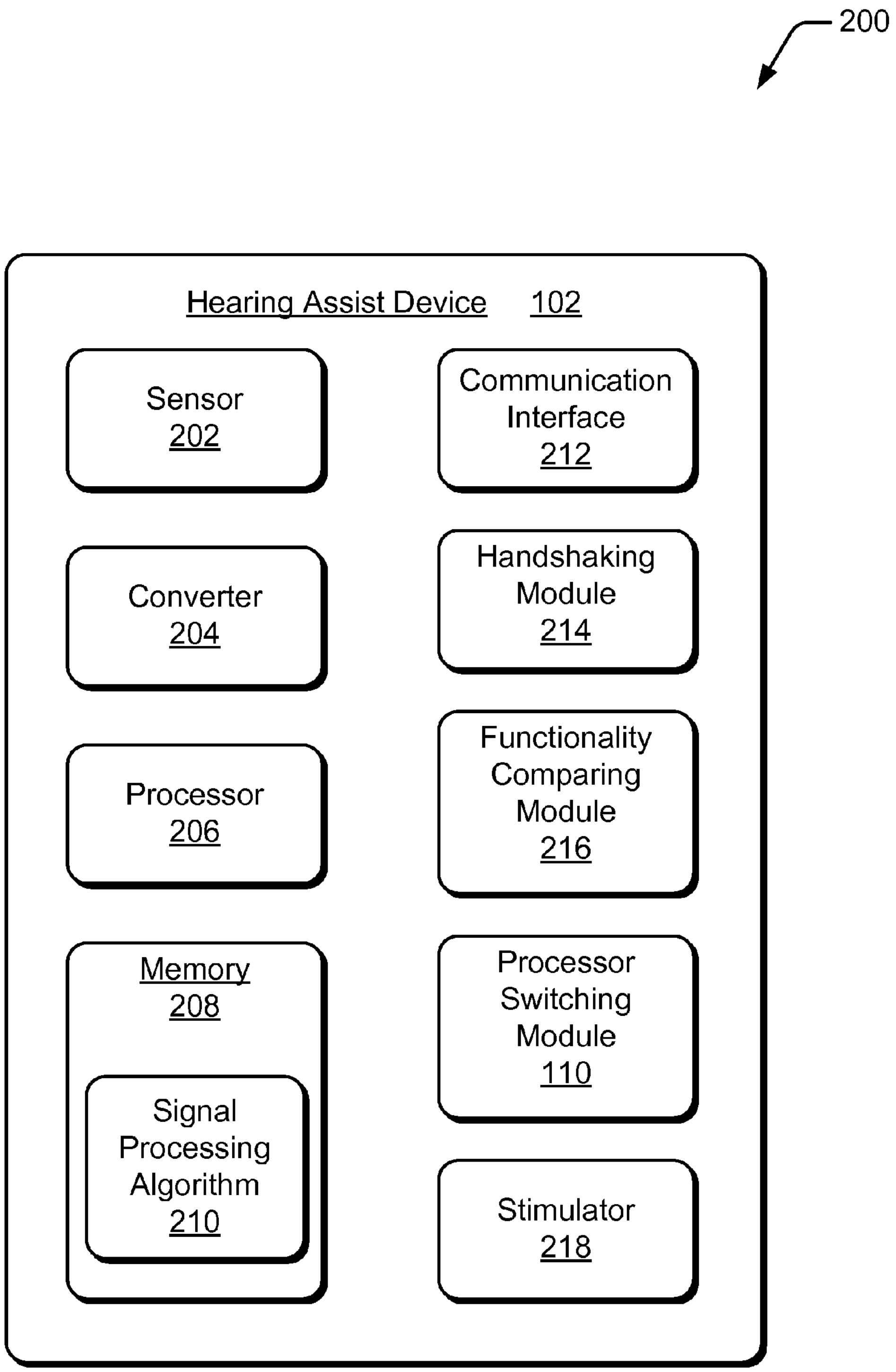
FIG. 2 is a schematic view of an illustrative hearing assist device usable in the system of FIG. 1.

FIG. 2 shows a schematic view 200 of the hearing assist device 102 of FIG. 1. The hearing assist device 102 includes a sensor 202 configured to detect energy in the form of sound waves. This sensor may be a microphone or any other device capable of detecting sound. The hearing assist device 102 may also include a converter 204 configured to convert the detected energy of the sound waves into a signal. The signal may be an analog signal, a digital signal, or a signal in any other form that is capable of undergoing processing. The signal is processed by a processor 206 of the hearing assist device 102. In some embodiments, the processor 206 is a digital signal processor (DSP). The hearing assist device 102 also includes a memory 208 which may be configured to store signal processing algorithms 210. Depending on the exact configuration and type of hearing assist device 102, the memory 208 may be volatile (such as random access memory (RAM)), non-volatile (such as read only memory (ROM) and flash memory), or some combination of the two. The signal processing algorithms 210 may include, but are not limited to, echo cancellation, noise reduction, directionality, speech processing, pitch-shifting, signal separation, audio compression, sub-band processing, language translation, user customized hearing profiles, and feedback reduction algorithms as well as audiologist customizations. The hearing assist device 102 also includes a communication interface 212 which may provide a communicative connection via a wired or wireless communication interface to coprocessor devices 104 or other hearing assist devices 102.

The handshaking module 214 of the hearing assist device 102 may be configured to receive information describing a functionality of the coprocessor device 104 via the communication interface 212. Examples of specific functionalities of the coprocessor device are described below. In some embodiments, the handshaking module 214 may also send information describing a functionality of the hearing assist device 102 to the coprocessor device 104. By using the handshaking module 214 to mediate initial communications between the hearing assist device 102 and the coprocessor device 104, the hearing assist device 102 is able to do more than merely open a communication channel to passively await a transfer of data. The handshaking module 214 allows for exchange of information describing the functionalities of the hearing assist device 102 and the coprocessor device 104, such that communicative connections will be made only if necessary and only to the extent necessary to provide an enhanced processing to the hearing assist device 102.

Once the functionalities of the hearing assist device 102 and the coprocessor device 104 are known, then a functionality comparing module 216 may compare the functionality of the coprocessor device 104 to the functionality of the hearing assist device 102. If multiple coprocessor devices 104 are available, the functionality comparing module 216 may compare the functionality of each coprocessor device 104 to each other and/or to the functionality of the hearing assist device 102. In some embodiments, the functionality may be a signal processing algorithm. The functionality comparing module 216 may determine that a signal processing algorithm on one of the coprocessor devices 104 provides a signal processing functionality absent from the hearing assist device 102 and also absent from other coprocessor devices 104. For example, a laptop computer functioning as a coprocessor device may have a pitch-shifting signal processing algorithm which all other devices in the system lack. In such a situation it may be desirable to process the signal at the laptop computer to benefit from the pitch-shifting ability of the coprocessor 104.

Even if a same general type of signal processing functionality is present on both the hearing assist device 102 and the coprocessor device 104, that signal processing functionality may be enhanced on the coprocessor device 104. For example, both the hearing assist device 102 and the coprocessor device 104 may include versions of a signal processing algorithm for signal separation, but the specific algorithm on the coprocessor device 104 may, for example, provide greater signal separation than the algorithm on the hearing assist device 102. Thus, the signal processing functionality present on the coprocessor device 104 is enhanced as compared to the signal processing functionality on the hearing assist device 102 because of the enhanced signal processing algorithm (e.g., the greater signal separation algorithm) available on the coprocessor device 104.

Enhanced signal processing functionality may also be achieved when two devices have identical signal processing algorithms but one device provides an enhanced processing capability. For example, the processor power or memory available on the coprocessor device 104 may allow that coprocessor device 104 to provide enhanced processing capability as compared to the hearing assist device 102 even when both devices use the same signal processing algorithm.

When multiple coprocessor devices 104 are present, the functionality comparing module 216 may compare a signal processing functionality of one coprocessor device 104 to another coprocessor device 104 to determine if any of the coprocessor devices 104 have a signal processing functionality absent from the other devices. The functionality comparing module 216 may also determine if any of the plurality of coprocessor devices 104 has an enhanced signal processing functionality (either in terms of a superior algorithm or in terms of processing power or memory) as compared to the other coprocessor devices 104.

The hearing assist device 102 also includes a processor switching module 110 configured to direct the signal for at least partial processing to the processor 206 of the hearing assist device 102 and/or a processor of the coprocessor device. Given the coprocessor devices 104 available to the hearing assist device 102 at any point in time, the functionality comparing module 216 will determine which processor or combination of processors can provide desired signal processing functionality for the needs of the user of the hearing assist device 102. The desired signal processing functionality may be determined in advance by an audiologist or manufactures of the hearing assist device. In some embodiments the desired signal processing functionality may be determined by the user (e.g. manual selection) or by the coprocessor device (e.g. if the coprocessor device is a car radio then the desired signal processing functionality includes correction for road and engine noise). The processor switching module 110 may then dynamically switch processing of the signal based on the comparisons performed by the functionality comparing module 216.

In some embodiments, the signal may be processed in series by the processor switching module 110 directing the signal to the processor 206 of the hearing assist device 102 and/or processors of one or more coprocessor devices 104. For example, a sound detected by the sensor 202 and converted to a signal by the converter 204 may be initially processed at the processor 206, sent to a first coprocessor via the communication interface 212 for additional processing, sent from the first coprocessor to a second coprocessor for further processing, and finally received from the second coprocessor via the communication interface 212. One benefit of processing the signal in series is that the processing by the first coprocessor device can be taken into account by the second coprocessor. In other embodiments, the signal may be processed in parallel by the processor 206 of the hearing assist device 102 and/or processors of one or more coprocessor devices 104. When processed in parallel, the signal may be processed substantially simultaneously by a plurality of processors and then the respective processed signals may be integrated into one signal at the hearing assist device 102 by an integrator (not shown). One possible benefit of processing the signal in parallel is that latency of signal processing by the coprocessors is minimized.

Ultimately, the processed signal is presented to the user of the hearing assist device. The hearing assist device 102 includes a stimulator configured to stimulate an auditory nerve of a user. The stimulator may take any form which directly or indirectly induces the auditory nerve to generate an electrical signal that is perceived by the user as representing sound. In some embodiments the stimulator may be a speaker. In other embodiments the stimulator may be a device, such as a cochlear implant, that acts directly on the auditory nerve.

While the hearing assist device 102 is shown and described as having certain hardware and software modules, it should be understood that all modules may be implemented as appropriate in hardware, software, firmware, or combinations thereof. If implemented by software, the software may reside on memory associated with any component of the hearing assist device 102, standalone memory provided in connection with the hearing assist device 102, a remote memory storage device, removable/nonremovable memory, a combination of the foregoing, or any other combination of one or more processor-readable media. While the hearing assist device 102 is shown as having certain modules, it should be understood that in some embodiments, one or more of the modules could be combined or omitted entirely.

Coprocessor Device

Figure 3:
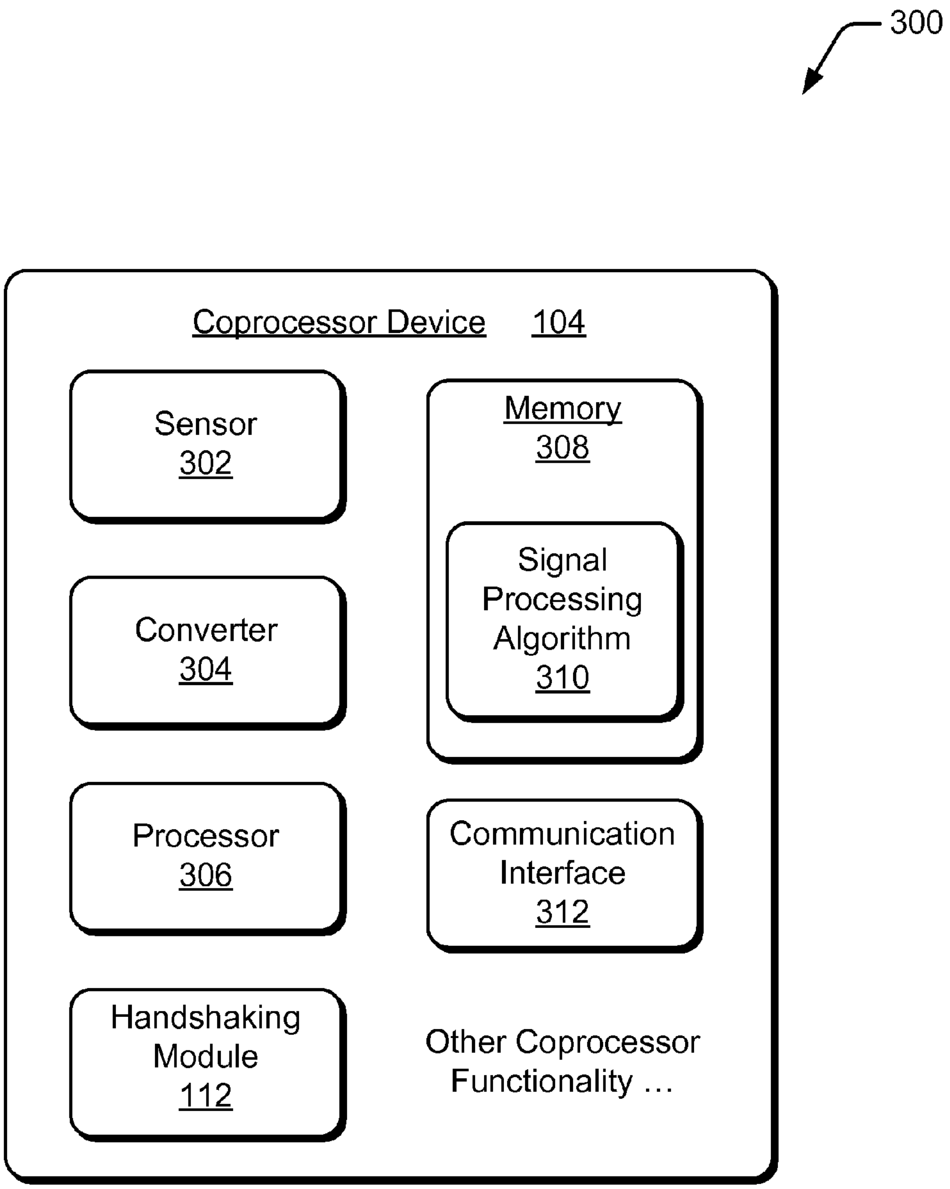
FIG. 3 is a schematic view of an illustrative coprocessor device usable in the system of FIG. 1.

FIG. 3 shows a schematic view 300 of the coprocessor device 104 of FIG. 1. The coprocessor device 104 may include a sensor 302, similar to the sensor 202 of the hearing assist device 102 of FIG. 2. In some embodiments, the sensor 302 may provide additional information used at least in part in processing the signal. For example, a microphone on the coprocessor device 104 may detect ambient noise and reduce the ambient so that the user can hear voices with enhanced clarity. The sensor 302 may also be used to enhance processing of directionality. The coprocessor device 104 may also include a converter 304 that may be similar to the converter 204 of the hearing assist device 102 of FIG. 2.

Coprocessor device 104 includes a processor 306 configured to process a signal. In one embodiment the signal may be a signal received from a hearing assist device 102. In another embodiment the signal may be a signal received from another coprocessor 104. In yet another embodiment the signal may be a signal from the converter 304.

Coprocessor device 104 also includes a memory 308 configured to store signal processing algorithms. The signal processing algorithms 310 may include, but are not limited to, echo cancellation, noise reduction, directionality, pitch shifting, signal separation, audio compression, sub-band processing, language translation, user customized hearing profiles, and feedback reduction algorithms as well as audiologist customizations.

The coprocessor device 104 also includes a communication interface 312 similar to the communication interface 212 of the hearing assist device 102 of FIG. 2. The communication interface 312 may be configured to send a signal processed by a processing module 314 (described below) to a hearing assist device 102 or another coprocessor device 104. In some embodiments the communication interface 312 may receive an indication of a functionality of the hearing assist device and/or an indication of a desired processing for the signal. The coprocessor device 104 may provide more signal processing functionality than required by a user. Rather than simply applying all possible processing to a signal, the indication of the desired processing for the signal may instruct the processor 306 as to which signal processing functionalities to apply. When a coprocessor device 104 is processing signals from a plurality of hearing assist devices 102, the indications of the functionality of the respective hearing assist devices 102 and the desired processing for the respective signals may allow the coprocessor device 104 to provide appropriate processing for each signal.

In some situations the coprocessor device 104 may initially lack a signal processing functionality required by the user. In one embodiment, the communication interface 312 may be configured to send a signal from the coprocessor device 104 to a server 110 in order to access additional signal processing functionality available on the server. For example, the server 110 may function similar to, or make use of, an ITUNES® server by receiving requests for signal processing algorithms (instead of songs) from one or many coprocessor devices 104 (instead of MP3 players). ITUNES® is available from Apple Corporation, of Mountain View, Calif. The coprocessor device 104 may be preconfigured with the address and access information for server 110, or the address and/or access information may be provided to the coprocessor device 104 along with the signal from the communication interface 312 of the hearing assist device. If multiple servers 110 are available the coprocessor device 104 may choose a server 110 from which to obtain the signal processing algorithm, or a server 110 may be designated by information received from the hearing assist device 102.

The handshaking module 112 of the coprocessor device 104 may be configured to send information describing a functionality of the coprocessor device 104 via the communication interface 312. The functionality of the coprocessor device 104 may include, but is not limited to, a processor speed, a processor load, a processor capability, a memory capacity, a memory capability, an available signal processing algorithm, an enhancement of a signal processing algorithm, a sensor capability, and a strength of a communication signal. Memory capacity may be any measure of a capacity to store information such as total capacity, available capacity, capacity dedicated to signal processing, and the like. Interactions between the handshaking module 214 of the hearing assist device 102 and the handshaking module 112 of the coprocessor device 104 allow the hearing assist device 102 to decide when and if to use the processing capabilities of available coprocessor devices 104. For example, the hearing assist device 102 may terminate a connection to the coprocessor device 104 immediately following handshaking if the coprocessor device 104 provides no signal processing functionality beyond that available on the hearing assist device 102. In other situations, the handshaking may continue even after a communication channel is established to inform the hearing assist device 102 of a change in the signal processing functionality of the coprocessor device 104. For example, the coprocessor device 104 may have a changed signal processing functionality due to installation of a new signal processing algorithm or change in a processor load due to changes in demands placed on the processor 306. If multiple servers 110 are available, the handshaking module 112 may decode information sent from the hearing assist device 102 in order to determine which server to utilize.

While the coprocessor device 104 is shown and described as having certain hardware and software modules, it should be understood that all modules may be implemented as appropriate in hardware, software, firmware, or combinations thereof. If implemented by software, the software may reside on memory associated with any component of the coprocessor device 104, standalone memory provided in connection with the coprocessor device 104, a remote memory storage device, removable/nonremovable memory, a combination of the foregoing, or any other combination of one or more processor-readable media. While the coprocessor device 104 is shown as having certain modules, it should be understood that in some embodiments, one or more of the modules could be combined or omitted entirely.

Signal Direction Process

Figure 4:
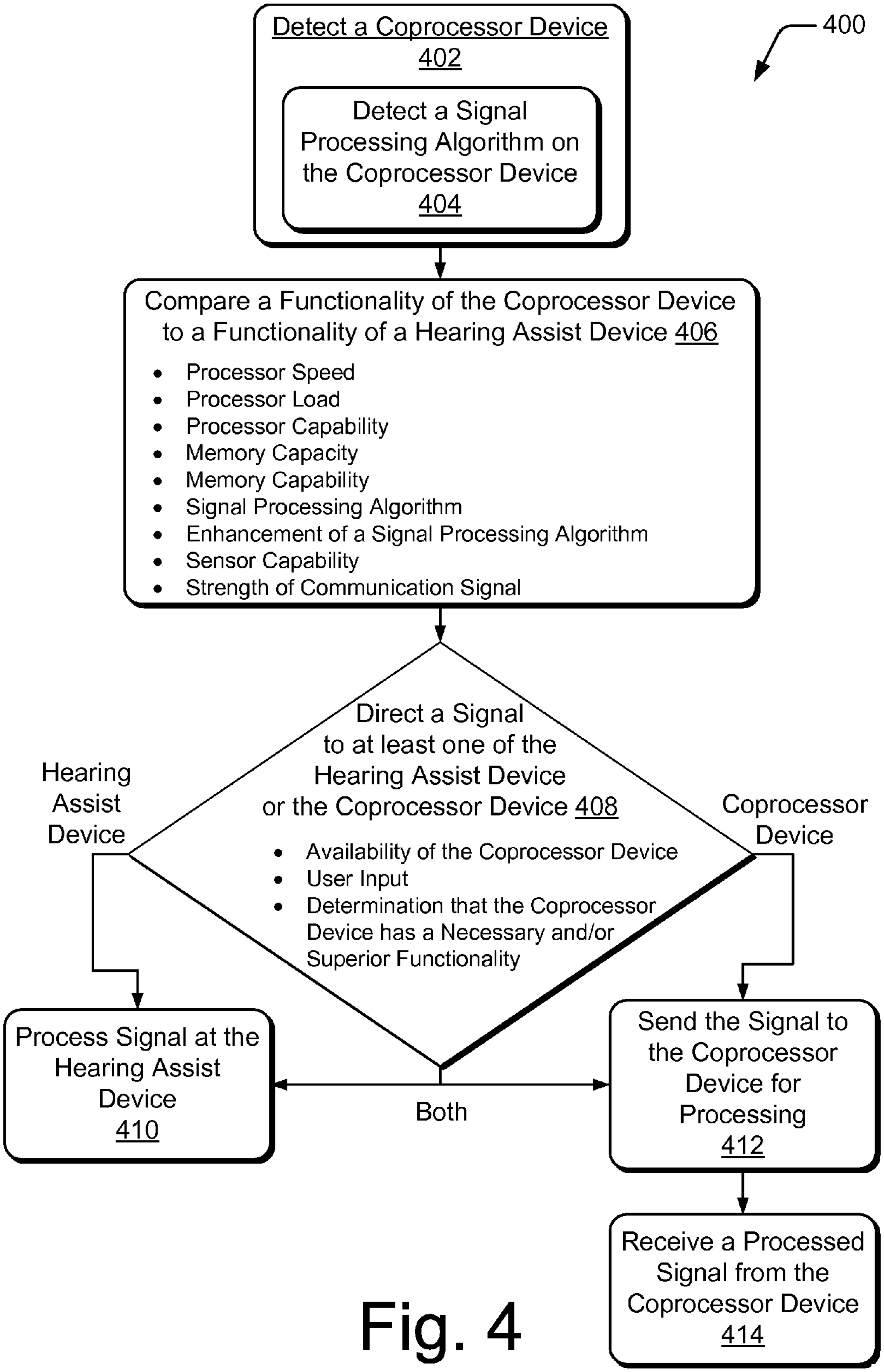
FIG. 4 is flowchart of an illustrative process for directing a signal for processing in accordance with an embodiment of the present disclosure.

FIG. 4. shows a flowchart of an illustrative process 400 for directing a signal for processing to either a hearing assist device and/or a coprocessor device. However, it should be understood that certain acts in each process contained in this disclosure need not be performed in the order described, may be modified, and/or may be omitted entirely, depending on the circumstances. The process 400 is described in the context of the system 100 of hearing assist devices and coprocessors shown in FIG. 1. However, the process 400 may be implemented using other systems and the system of FIG. 1 may be used to implement other processes.

Referring back to FIG. 4, at 402, a hearing assist device detects a coprocessor device. In some embodiments the detection includes detecting a signal processing algorithm on the coprocessor device (at 404). At 406, process 400 compares a functionality of the coprocessor device to a functionality of a hearing assist device. The type of functionality compared from coprocessor device to hearing assist device may be the same (e.g., processor speed vs. processor speed) or different (e.g., available signal processing algorithm vs. enhancement of a signal processing algorithm). In some embodiments, this comparison may be performed by the functionality comparing module 216 of the hearing assist device 102 of FIG. 2. The functionalities compared may include, but are not limited to, a processor speed, a processor load, a processor capability (e.g., graphics rendering), a memory capacity, a memory capability (e.g., access speed), an available signal processing algorithm, an enhancement of a signal processing algorithm, a sensor capability, and a strength of a communication signal.

At 408, the process 400 directs a signal to a processor of the hearing assist device and/or the coprocessor device. As discussed above, the signal may be processed by either or both devices. The directing may be performed by the processor switching module 104 of the hearing assist device 102 of FIG. 2. In some embodiments the directing is based on an availability of the coprocessor device (e.g., if a coprocessor device is available direct the signal to the coprocessor device), a user input (e.g., a user manually selects where the signal is directed), or simply a determination that, based on the comparing at 406, the coprocessor device has a necessary functionality to process the signal. The necessary functionality may include any functionality that will enhance processing of the signal (e.g., in terms of signal quality, speed of processing, etc.). In some embodiments the directing, at 408, is based on the comparing performed at 406, and the comparing compares one or more signal processing algorithms available on the coprocessor device to one or more signal processing algorithms available on the hearing assist device.

The directing of the signal at 408 may direct the signal to be processed, at 410, by the hearing assist device. For example, if no coprocessor devices are available, then the signal will be processed at the hearing assist device. The signal may also be directed to the hearing assist device if the functionality at the coprocessor device is the same as, or inferior to, the functionality at the hearing assist device.

The directing of the signal at 408 may also direct the signal to be processed at the coprocessor device. In order to process the signal at the coprocessor device, the signal is sent to the coprocessor device for processing (at 412). Following that processing, the hearing assist device will receive a processed signal from the coprocessor device (at 414). For example, the signal may be directed to the coprocessor device whenever the coprocessor device is available. Additionally or alternatively, the signal may be directed to the coprocessor device based on a user input. The user input may, in some embodiments, override other considerations regarding direction of a signal. Directing the signal to the coprocessor device and/or receiving a processing signal from the coprocessor device (at 412) also includes the directing and/or receiving with respect to a plurality of coprocessor devices. In another example, the signal may be directed to the coprocessor device based upon a determination that the coprocessor device has a necessary and/or superior functionality.

The direction of the signal at 408 may direct the signal to both the hearing assist device and to the coprocessor device. As discussed above, the signal may be split and processed by a plurality of processors in parallel or sent in series through a plurality of processors. Directing the signal to both devices may occur, for example, if the hearing assist device has some signal processing algorithms not available on the coprocessor device, and the coprocessor device has other signal processing algorithms not available on the hearing assist device. Parallel processing on the hearing assist device and coprocessor may also be used to speed overall processing of the signal by distributing the processing job between the devices.

Figure 5A:
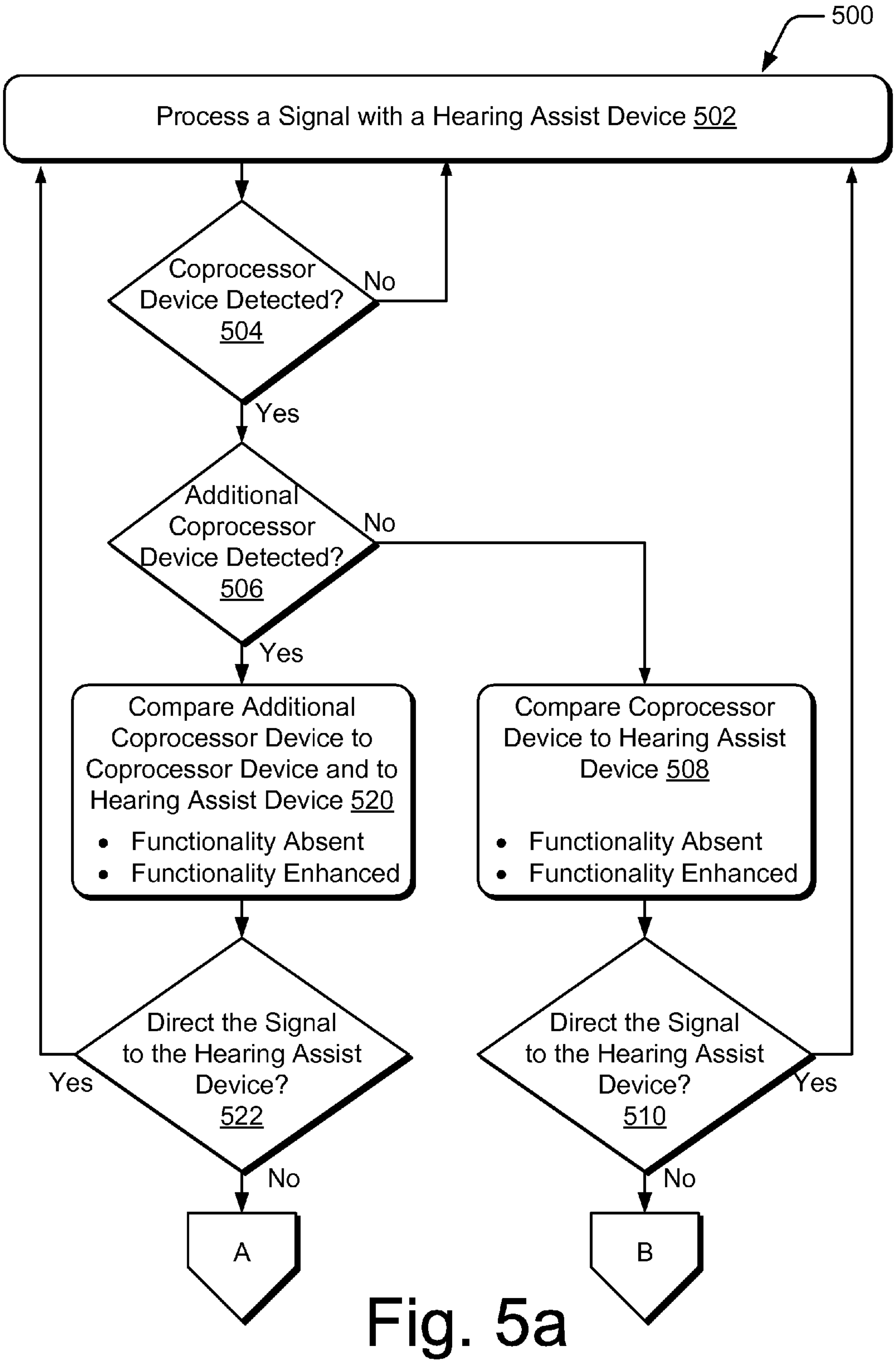
FIG. 5 is flowchart of an illustrative process for directing a signal for processing in accordance with another embodiment of the present disclosure.
Figure 5B:
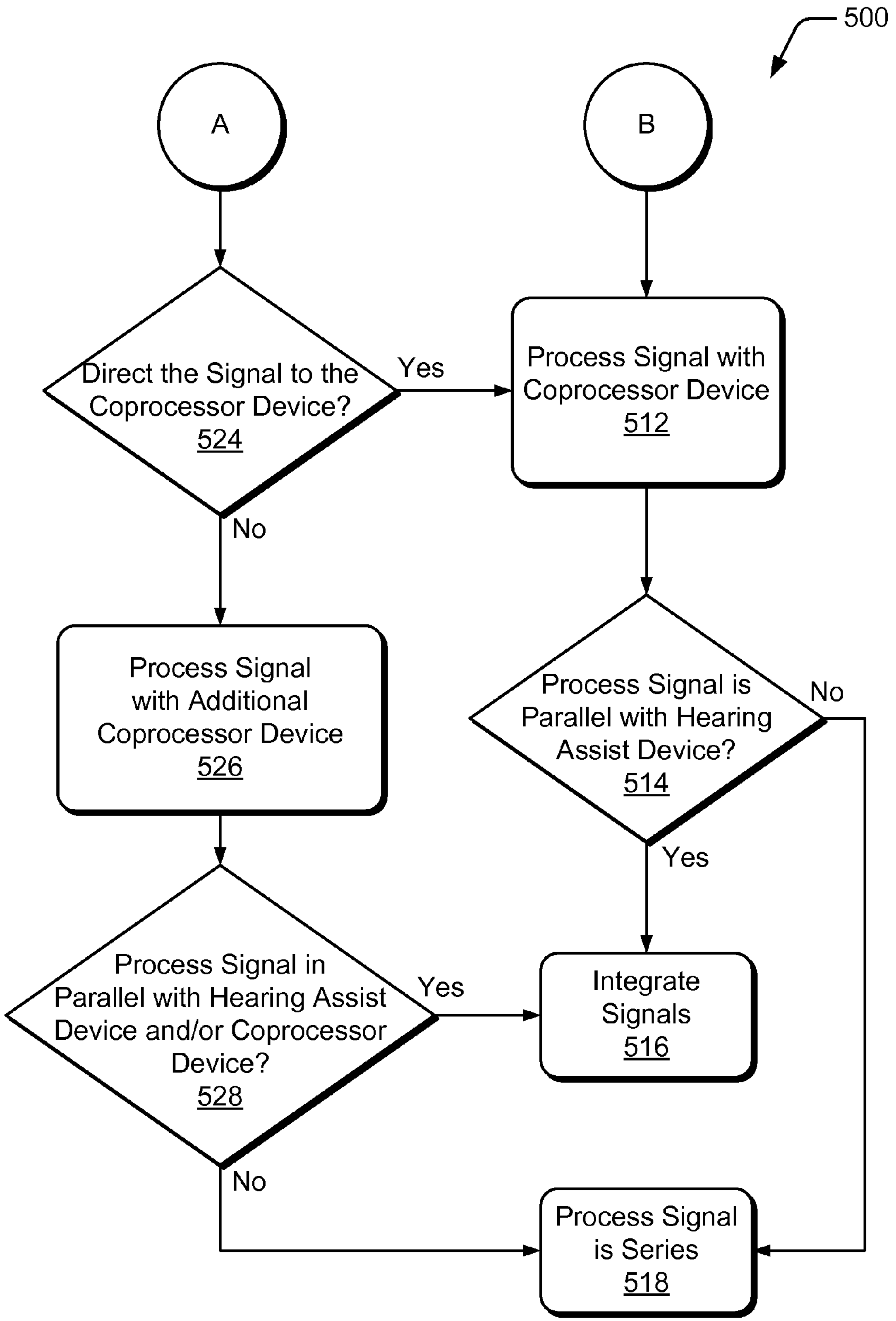

FIGS. 5*a* and 5*b* show a flowchart of an illustrative process 500 for directing a signal for processing to a hearing assist device, a coprocessor device, and/or an additional coprocessor device. At 502, the signal is processed with a hearing assist device. The processing may include any of the signal processing algorithms discussed above or other processing. At 504, a coprocessor device may be detected. The detecting may be performed by the handshaking module 214 of FIG. 2. The detecting of the coprocessor device may be based on information received via the communication interface 212 of FIG. 2. If no coprocessor is detected at 504, the hearing assist device functions as a stand-alone device and the process 500 returns to 502 to process the signal with the hearing assist device.

If a coprocessor is detected at 504, the hearing assist device detects any additional coprocessor devices at 506. Any number of coprocessor devices (including additional coprocessor devices) may be detected by the hearing assist device. If more than two coprocessor devices are available, the detection at 506 may repeat until no additional coprocessor devices are detected. The detection of an additional coprocessor device may be via a direct connection (e.g., wired or wireless) to the communication interface 212 of the hearing assist device. In some embodiments the detection may be indirect. For example, the hearing assist device may detect the coprocessor device, but the hearing assist device may be unable to detect the additional coprocessor device. In such situations the coprocessor device may act as a bridge connecting the hearing assist device and the additional coprocessor device. In one embodiment the hearing assist device may have a wireless connection to a coprocessor device and the coprocessor device may be connected to a network, such as the Internet, thus connecting the coprocessor device—and indirectly the hearing assist device—to additional coprocessor devices. The coprocessor device may also be connected by a network to other devices such as servers, data stores, databases, or the like containing additional signal processing algorithms.

Following detection at 504 and/or at 506, the hearing assist device is connected, directly or indirectly, through wired or wireless connections to one or more coprocessor devices. Each of the coprocessor devices has a signal processing functionality that may be the same or different from the other coprocessor devices and from the hearing assist device. If no additional coprocessor is detected at 506, then at 508 a functionality of the coprocessor device is compared to a functionality of the hearing assist device. In some embodiments the comparing compares signal processing functionalities of both devices and may determine that one device has a functionality absent from the other device. For example, a pitch shifting functionality may be absent from the hearing assist device but available on the coprocessor device. In other embodiments the comparing compares signal processing functionalities, determines that a same functionality is present on both devices, but enhanced on one of the devices. The enhancement may be an enhanced signal processing algorithm. For example, both devices may have a noise reduction functionality, but the coprocessor device may have an enhanced algorithm that achieves greater noise reduction. The enhancement may also be an enhancement achieved through an enhanced processing capability. For example, the hearing assist device and the coprocessor device may both have a same noise reduction algorithm, but due to a faster processor in the coprocessor device the coprocessor device can achieve greater noise reduction and/or complete the processing in a shorter time, and thus, has an enhanced noise reduction functionality. Enhanced signal processing functionality is also possible due to a combination of an enhanced signal processing algorithm and an enhanced processing capability.

At 510, the signal may be directed to the hearing assist device for at least partial processing. In some embodiments the directing is based on the comparing at 508. For example, if the hearing assist device has a signal processing functionality absent from the coprocessor device or a signal processing functionality is enhanced on the hearing assist device then the signal will be directed to the hearing assist device. Alternatively, at 510, if the signal is not directed to the hearing assist device, it is directed to the coprocessor device. The signal is processed with the coprocessor device at 512. As discussed above, the signal may be processed in part by the hearing assist device and in part by the coprocessor device.

While 510 shows a yes/no split, it is to be understood that processing of the signal may be distributed between the hearing assist device and the coprocessor device based on the respective signal processing functionality present on each device or based on other factors. The signal may be processed in series (e.g., first at the hearing assist device and then at the coprocessor device or vice versa) or in parallel (e.g., substantially simultaneously at the hearing assist device and at the coprocessor device) and the resulting processed signals may be integrated at the hearing assists device before presentation to the user. If, at 514, the signal is processed in parallel with the hearing assist device and/or an additional coprocessor device the process 500 follows the "yes" path and the signals which were processed in parallel are integrated at the hearing assist device (at 516). If, at 514, the process 500 follows the "no" path then the signals are processed in series (at 518) and do not require integration.

If, at 506, the additional coprocessor device is detected, the respective functionalities of the hearing assist device, the coprocessor device, and the additional coprocessor device are compared at 520. The comparisons at 520 are analogous to the comparisons at 508, but at 520 three (or more) devices are compared each to the others. Connections between the hearing assist device and the coprocessor device and/or the additional coprocessor device may be dynamic. Wireless signals may be lost and wired connections may be unplugged. Presence of the coprocessor device and/or the additional coprocessor device may be confirmed by periodic pings sent from the hearing assist device or heartbeats sent from the coprocessor device or the additional coprocessor device. Absence of a previously available coprocessor device or additional coprocessor device may be detected by a failure to receive an expected signal from the coprocessor device or the additional coprocessor device. If the coprocessor device or the additional coprocessor device is no longer detected, then the comparing at 520 (or at 508) may repeat. The results of the comparing may change when available coprocessors change.

At 522, the signal may be directed to the hearing assist device for at least partial processing.

The process 500 continues in FIG. 5*b*. At 524, the signal may be directed to the coprocessor for at least partial processing. If the signal is not directed to either the hearing assist device or the coprocessor device the signal may be directed to the additional coprocessor device for processing (at 526). In embodiments with more than one additional coprocessor devices the directing repeats in a similar manner.

As discussed above, the processing may be in series or in parallel. If, at 528, the signal is processed in parallel with the hearing assist device and/or the coprocessor device the process 500 follows the "yes" path and the signals which were processed in parallel are integrated at the hearing assist device (at 516). If, at 528, the process 500 follows the "no" path then the signals are processed in series (at 518) and do not require integration. With three or more devices the processing may also be a combination of series and parallel processing. For example, the signal may be processed in series with respect to the hearing assist device and the coprocessor devices as a group and processed in parallel with respect to the coprocessor device and the additional coprocessor device.

Any of the acts of any of the methods described herein may be implemented at least partially by a processor or other electronic device based on instructions stored on one or more processor-readable media. By way of example, and not limitation, processor-readable media may comprise volatile and nonvolatile, removable and non-removable media implemented in any method or technology for storage of information such as processor-readable instructions, data structures, program modules or other data. Processor-readable media includes, but is not limited to, RAM, ROM, electrically erasable programmable ROM (EEPROM), flash memory or other memory technology, compact disk-ROM (CD-ROM), digital versatile disks (DVD) or other optical storage, magnetic cassettes, magnetic tape, magnetic disk storage or other magnetic storage devices, or any other medium which can be used to store the desired information. Combinations of any of the above should also be included within the scope of processor-readable media.

CONCLUSION

Although the subject matter has been described in language specific to structural features and/or methodological acts, it is to be understood that the subject matter defined in the appended claims is not necessarily limited to the specific features or acts described. Based on the teachings of the present disclosure, a variety of alternate embodiments may be conceived, and the present disclosure is not limited to the particular embodiments described herein and shown in the accompanying figures. Rather, the specific features and acts are disclosed as illustrative examples.

What is claimed is:

1. One or more processor-readable storage media containing instructions that, when executed by a processor, perform acts comprising:

detecting a coprocessor device;

comparing a functionality of a hearing assist device to a functionality of the coprocessor device to determine if:

a signal processing functionality absent from the hearing assist device is available on the coprocessor device or a signal processing functionality absent from the coprocessor device is available on the hearing assist device; or a signal processing functionality present on the hearing assist device is enhanced on the coprocessor device or a signal processing functionality present on the coprocessor device is enhanced on the hearing assist device; and directing a signal obtained at the hearing assist device for at least partial processing to at least one the hearing assist device or the coprocessor device.

2. The one or more processor-readable storage media of claim 1, further comprising:

detecting an additional coprocessor device;

comparing the functionality of at least one of the hearing assist device or the coprocessor device to the additional coprocessor device to determine if:

a signal processing functionality absent from one of the hearing assist device, the coprocessor device, or the additional coprocessor device is available on the hearing assist device, the coprocessor device, or the additional coprocessor device; or a signal processing functionality present on one of the hearing assist device, the coprocessor device, or the additional coprocessor device is enhanced on the hearing assist device, the coprocessor device, or the additional coprocessor device; and directing the signal obtained at the hearing assist device for at least partial processing to at least one the hearing assist device or the coprocessor device, or the additional coprocessor device.

3. The one or more processor-readable storage media of claim 1, wherein the signal processing functionality present on the hearing assist device is enhanced on the coprocessor device or the additional coprocessor device, the enhancement comprising at least one of an enhanced signal processing algorithm or an enhanced processing capability of the coprocessor device or the additional coprocessor device.

4. The one or more processor-readable storage media of claim 1, further comprising repeating the comparing if at least a one of the coprocessor device or the additional coprocessor device is no longer detected.

5. The one or more processor-readable storage media of claim 1, wherein the directing directs the signal to the hearing assist device for processing if the coprocessor device and the additional coprocessor device are no longer detected.

6. The one or more processor-readable storage media of claim 1, wherein the signal is processed at least partially in parallel by a plurality of the hearing assist device, the coprocessor device, or the one or more additional coprocessor devices.

7. A one or more processor-readable storage media of claim 1, wherein the signal is processed at least partially in series by a plurality of the hearing assist device, the coprocessor device, or the one or more additional coprocessor devices.

8. A method comprising:

detecting a coprocessor device;

comparing a functionality of the coprocessor device to a functionality of a hearing assist device; and directing a signal to at least one of the hearing assist device or the coprocessor device.

9. The method of claim 8, wherein the detecting includes detecting a signal processing algorithm on the coprocessor device.

10. The method of claim 8, wherein the directing is based on the comparing and the comparing compares one or more signal processing algorithms available on the coprocessor device to one or more signal processing algorithms available on the hearing assist device.

11. The method of claim 8, wherein the directing is based on at least one of:

an availability of the coprocessor device;

a user input; or a determination that, based on the comparing, the coprocessor device has a necessary functionality to process the signal.

12. The method of claim 8, wherein the functionality of the coprocessor device and the functionality of the hearing assist device each comprise at least one of:

a processor speed;

a processor load;

a processor capability;

a memory capacity;

a memory capability;

an available signal processing algorithm;

an ability to enhance a signal processing algorithm;

a sensor capability; or a strength of a communication signal.

13. The method of claim 8 further comprising:

determining that the coprocessor device lacks a desired functionality; and instructing the coprocessor device to obtain the desired functionality from a server.

14. The method of claim 8, further comprising processing the signal at least in part by the hearing assist device if the directing directs the signal to the hearing assist device.

15. The method of claim 8, further comprising receiving a processed signal from the coprocessor device if the directing directs the signal to the coprocessor device, wherein the processed signal is processed at least in part by the coprocessor device.

16. The method of claim 8, further comprising:

processing the signal in part by the hearing assist device and receiving a processed signal from the coprocessor device if the directing directs the signal to the hearing assist device and the coprocessor device, wherein the processed signal is processed in part by the coprocessor device.

17. A method comprising:

receiving a handshake communication indicating a desired signal processing algorithm for processing a signal from a hearing assist device;

receiving the signal from the hearing assist device;

communicating with a server storing the desired signal processing algorithm;

managing a processing of the signal with the desired signal processing algorithm to obtain a processed signal; and sending the processed signal to the hearing assist device.

18. The method of claim 17, wherein the managing comprises receiving the desired signal processing algorithm from the server and processing the signal with the received, desired signal processing algorithm.

19. The method of claim 17, wherein the managing comprises sending the signal to the server and receiving the processed signal from the server following processing with the desired signal processing algorithm.

20. A hearing assist device comprising:

a sensor configured to detect energy in the form of sound waves;

a converter configured to convert the detected energy into a signal;

a memory configured to store one or more signal processing algorithms;

a processor configured to execute one or more of the signal processing algorithms to process the signal;

a communication interface configured to communicate with a coprocessor device;

a handshaking module configured to receive information regarding a functionality of the coprocessor device via the communication interface;

a functionality comparing module configured to compare the functionality of the coprocessor device to a functionality of the hearing assist device;

a processor switching module configured to direct the signal to at least one of the processor of the hearing assist device or a processor of the coprocessor device; and a stimulator configured to stimulate an auditory nerve of a user based on the signal as processed by at least one of the processor of the hearing assist device or the processor of the coprocessor device.

21. The hearing assist device of claim 20, wherein the handshaking module is further configured to send information regarding the functionality of the hearing assist device to the coprocessor device.

22. The hearing assist device of claim 20, wherein the processor switching module is configured to direct the signal based on a comparison performed by the functionality comparing module.

23. The hearing assist device of claim 20, wherein the stimulator comprises one of a speaker or a cochlear implant.

24. A coprocessor device comprising:

a memory configured to store one or more signal processing algorithms;

a processor configured execute one or more of the signal processing algorithms to process a signal;

a communication interface configured to communicate with at least one of a hearing assist device or an additional coprocessor device; and a handshaking module configured to send information regarding a functionality of the coprocessor to a hearing assist device via the communication interface.

25. The coprocessor device of claim 24, wherein the communication interface receives the signal from the hearing assist device and the processor processes the signal using the signal processing algorithms.

26. The coprocessor device of claim 24, wherein the processor is further configured to process a plurality of signals received from a plurality of hearing assist devices and to send the plurality of processed signals to each respective one of the plurality of hearing assist devices.

27. The coprocessor device of claim 24, further comprising a sensor configured to provide additional information used at least in part in processing of the signal.

28. The coprocessor device of claim 27, wherein the sensor comprises a microphone.

29. The coprocessor device of claim 24, wherein the communication interface is configured to receive an indication of a functionality of the hearing assist device and an indication of a desired processing for the signal, and to send the signal processed by the processing module to the hearing assist device.

30. The coprocessor device of claim 24, wherein the functionality comprises at least one of availability of coprocessor device, processor speed, processor capability, memory capacity, memory capability, signal processing algorithms available on the coprocessor device, a number of sensors, or a strength of a communication signal.

31. The coprocessor device of claim 24, wherein the communication interface is further configured to:

receive from the hearing assist device an indication of a desired processing for the signal; and responsive to the receipt of the indication, obtain from a server one or more signal processing algorithms to perform the desired processing, the one or more signal processing algorithms.

* * * * *